(12) United States Patent
Skorpik et al.

(10) Patent No.: US 7,791,480 B2
(45) Date of Patent: Sep. 7, 2010

(54) PROCESS CONTROL MONITORING SYSTEMS, INDUSTRIAL PLANTS, AND PROCESS CONTROL MONITORING METHODS

(75) Inventors: James R. Skorpik, Kennewick, WA (US); Stephen R. Gosselin, Richland, WA (US); Joe C. Harris, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 6 days.

(21) Appl. No.: 11/811,499

(22) Filed: Jun. 11, 2007

(65) Prior Publication Data

US 2007/0239400 A1 Oct. 11, 2007

Related U.S. Application Data

(62) Division of application No. 10/691,758, filed on Oct. 22, 2003, now abandoned.

(51) Int. Cl.
*G08B 13/14* (2006.01)

(52) U.S. Cl. .................................. 340/572.1; 340/540

(58) Field of Classification Search ............. 340/572.1, 340/10.1, 539.22, 539.26, 540
See application file for complete search history.

(56) References Cited

U.S. PATENT DOCUMENTS

| | | | |
|---|---|---|---|
| 3,462,115 A | 8/1969 | Barker | |
| 4,805,451 A | 2/1989 | Leon | |
| 5,197,328 A | 3/1993 | Fitzgerald | |
| 5,329,956 A | 7/1994 | Marriot et al. | |
| 5,628,229 A | 5/1997 | Krone et al. | |
| 5,745,049 A * | 4/1998 | Akiyama et al. | 340/870.17 |
| 5,774,048 A | 6/1998 | Achterholt | |
| 5,797,417 A | 8/1998 | DeLattre et al. | |
| 5,905,648 A | 5/1999 | Badami | |
| 6,005,480 A | 12/1999 | Banzhof et al. | |
| 6,026,352 A | 2/2000 | Burns et al. | |
| 6,152,162 A | 11/2000 | Balazy et al. | |
| 6,178,997 B1 | 1/2001 | Adams et al. | |
| 6,199,575 B1 | 3/2001 | Widner | |
| 6,199,629 B1 | 3/2001 | Shirk et al. | |
| 6,445,969 B1 | 9/2002 | Kenney et al. | |
| 6,453,261 B2 | 9/2002 | Boger et al. | |
| 6,484,080 B2 | 11/2002 | Breed | |
| 6,563,417 B1 | 5/2003 | Shaw | |
| 6,668,639 B2 | 12/2003 | Fong et al. | |
| 6,677,852 B1 * | 1/2004 | Landt | 340/10.1 |

(Continued)

OTHER PUBLICATIONS

U.S. Appl. No. 09/589;001, filed Jun. 6, 2000; R.W. Gilbert et al.; Remote Communication System and Method; now abandoned.

(Continued)

*Primary Examiner*—Toan N Pham
*Assistant Examiner*—Kerri McNally
(74) *Attorney, Agent, or Firm*—Wells St. John, P.S.

(57) ABSTRACT

A system comprises a valve; a plurality of RFID sensor assemblies coupled to the valve to monitor a plurality of parameters associated with the valve; a control tag configured to wirelessly communicate with the respective tags that are coupled to the valve, the control tag being further configured to communicate with an RF reader; and an RF reader configured to selectively communicate with the control tag, the reader including an RF receiver. Other systems and methods are also provided.

33 Claims, 4 Drawing Sheets

U.S. PATENT DOCUMENTS

| | | |
|---|---|---|
| 6,690,284 B2 | 2/2004 | Ohno et al. |
| 6,704,690 B2 * | 3/2004 | Koh et al. .................... 702/188 |
| 6,738,025 B2 | 5/2004 | Carrender |
| 6,745,008 B1 | 6/2004 | Carrender et al. |
| 6,765,476 B2 | 7/2004 | Steele et al. |
| 6,842,106 B2 | 1/2005 | Hughes et al. |
| 6,868,073 B1 | 3/2005 | Carrender |
| 6,889,096 B2 * | 5/2005 | Spriggs et al. ................ 700/17 |
| 6,914,528 B2 | 7/2005 | Pratt et al. |
| 6,941,202 B2 * | 9/2005 | Wilson et al. ................ 701/29 |
| 6,995,652 B2 | 2/2006 | Carrender et al. |
| 6,995,655 B2 | 2/2006 | Ertin et al. |
| 7,009,495 B2 | 3/2006 | Hughes et al. |
| 7,009,515 B2 | 3/2006 | Carrender |
| 7,009,526 B2 | 3/2006 | Hughes et al. |
| 7,019,617 B2 | 3/2006 | Pratt et al. |
| 7,019,618 B2 | 3/2006 | Pratt et al. |
| 7,039,537 B2 | 5/2006 | Junk |
| 2004/0008120 A1 * | 1/2004 | Duncan et al. .............. 340/685 |
| 2004/0066752 A1 | 4/2004 | Hughes et al. |
| 2004/0067764 A1 | 4/2004 | Pratt et al. |
| 2004/0159515 A1 | 8/2004 | Bell et al. |
| 2004/0160322 A1 * | 8/2004 | Stilp ....................... 340/572.1 |
| 2004/0212493 A1 * | 10/2004 | Stilp ......................... 340/531 |
| 2005/0035860 A1 * | 2/2005 | Taylor et al. ............. 340/572.1 |

OTHER PUBLICATIONS

U.S. Appl. No. 09/588,997; filed Jun. 6, 2000; R.W. Gilbert et al.; "Phase Modulation in RF Tag"; now abandoned.

* cited by examiner

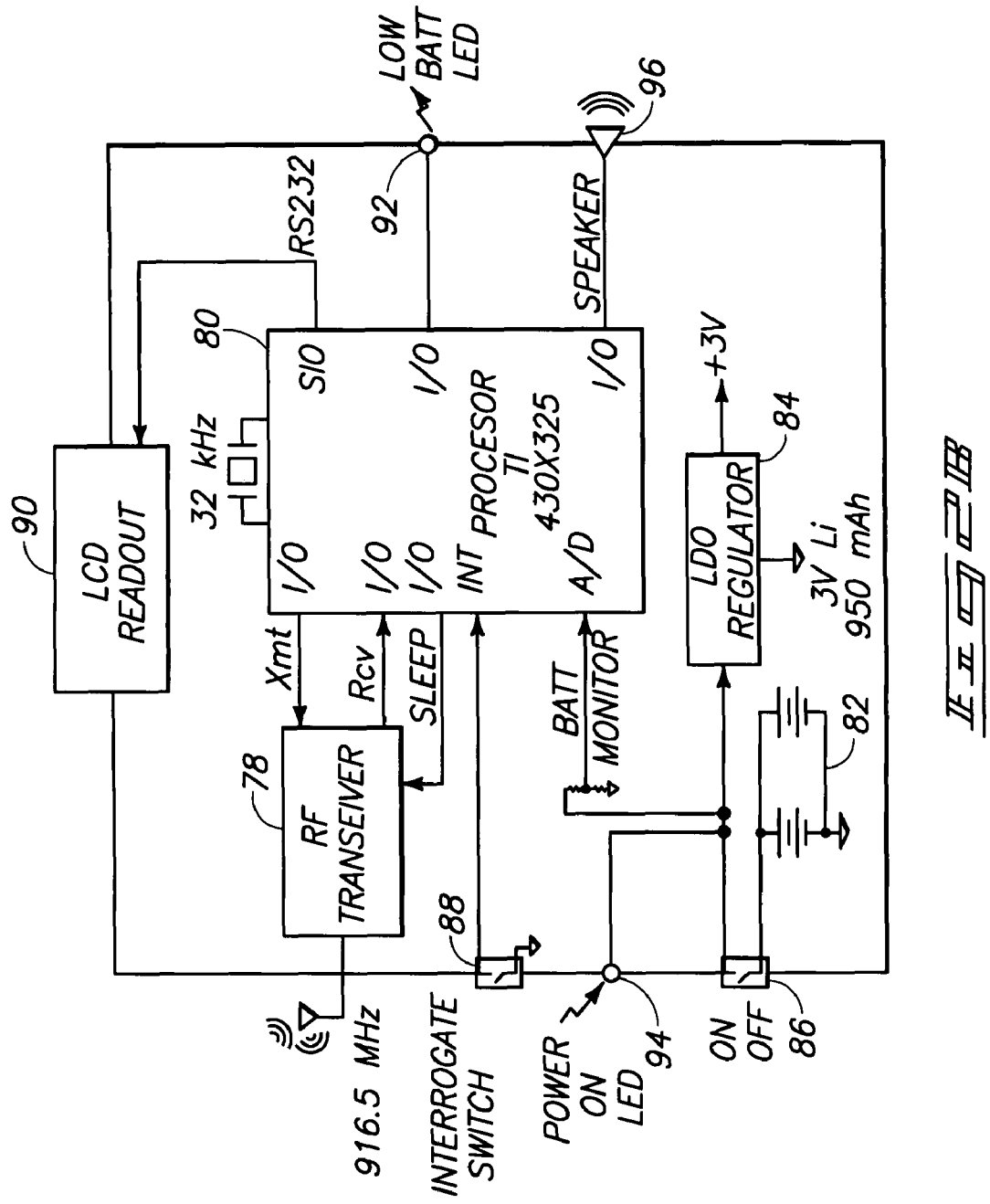

PROCESS CONTROL MONITORING SYSTEMS, INDUSTRIAL PLANTS, AND PROCESS CONTROL MONITORING METHODS

CROSS REFERENCE TO RELATED APPLICATIONS

This is a divisional of and claims priority to U.S. patent application Ser. No. 10/691,758, filed Oct. 22, 2003 now abondoned, titled "Sensor Assembly, System Including RFID Sensor Assemblies, and Method", listing James R. Skorpik, Stephen R. Gosselin, and Joe C. Harris as inventors, the specification of which is incorporated herein by reference.

GOVERNMENT RIGHTS

This invention was made with government support under contract number DE-AC0676RL01830 awarded by the U.S. Department of Energy. The Government has certain rights in the invention.

TECHNICAL FIELD

The invention relates to sensors. The invention also relates to valves and process control.

BACKGROUND OF THE INVENTION

Industrial process control environments typically require physical sensing of parameters such as temperature, pressure, flow rate, strain, displacement, humidity, vibration, etc. Adapting a sensor network and its cabling infrastructure to existing plant environments is usually cost prohibitive.

Various sensors that incorporate transmitters are known in the art. For example, U.S. Pat. No. 5,774,048 (incorporated herein by reference) relates to a valve that generates a wireless transmittable signal if pressure drops within vehicle tires. U.S. Pat. No. 6,005,480 to Banzhof et al. relates to similar subject matter.

U.S. Pat. No. 6,199,575 to Widner (incorporated herein by reference) discloses a valve system that includes a MEMS pressure sensor that senses pressure and functions as a mechanical actuator for a valve. A transmitter is integrated with the valve and a receiver is located at a remote location. A transmitter may be formed on the MEMS along With a pressure transducer and its associated circuitry. An alternative embodiment is disclosed in which a digital modulator is included in a transducer valve.

U.S. Pat. No. 6,445,969 to Kenney et al. (incorporated herein by reference) discloses a system and method of monitoring process parameters associated with a manufacturing or testing process. This reference discloses that radio frequency identification tags may be used to transmit an event signal. If an event trigger is detected, a command is sent to a particular sensor to measure a specified process parameter.

U.S. Pat. No. 6,484,080 to Breed discloses an acceleration sensor including an RFID unit. U.S. Pat. No. 6,563,417 to Shaw discloses an RFID tag including a temperature sensor.

Pneumatic or fluid controlled valves are known in the art and used in a variety of applications, such as to control water and other fluids in nuclear reactors. Such valves are discussed in U.S. Pat. No. 5,197,328 to Fitzgerald; U.S. Pat. No. 6,026,352 to Burns et al.; U.S. Pat. No. 5,329,956 to Marriott et al.; and U.S. Pat. No. 5,774,048 to Achterholt, all of which are incorporated by reference. In a typical pneumatic operated valve, a current to pressure (I/P) transducer is coupled to a valve positioner which supplies an operating pneumatic pressure to a valve diaphragm actuator. The diaphragm actuator in turn is coupled to a sliding valve stem and plug. Feedback is provided by a mechanical linkage, such as by a valve positioner arm having one end connected to the actuator/valve stem and the other end coupled to the positioner so as to track movement of the valve stem. Alternatively, electrical signal feedback is provided from installed valve positioner instrumentation.

The value of sensor for providing both diagnostics and prognostics is readily accepted; however, innovative technical developments are needed to facilitate the implementation.

SUMMARY OF THE INVENTION

Some aspects of the invention provide a system comprising a valve; a plurality of RFID sensor assemblies coupled to the valve to monitor a plurality of parameters associated with the valve; a control tag configured to wirelessly communicate with the respective tags that are coupled to the valve, the control tag being further configured to communicate with an RF reader; and an RF reader configured to selectively communicate with the control tag, the reader including an RF receiver:

Other aspects of the invention provide a suite of RFID sensor assemblies for use in industrial process control. The suite can include, for example, sensors configured to sense one or more of temperature, pressure, strain, or other process control parameters. In some aspects of the invention, a tailored mechanical package is provided to allow the RFID tag to be readily adapted to a particular process component or parameter.

BRIEF DESCRIPTION OF THE DRAWINGS

Preferred embodiments of the invention are described below with reference to the following accompanying drawings.

FIG. 2B is a reader embodying various aspects of the invention.

FIG. 3 is a perspective view of an RFID sensor assembly in accordance with some embodiments.

FIG. 4 is a perspective view of an RFID sensor assembly in accordance with other embodiments.

DETAILED DESCRIPTION OF THE PREFERRED EMBODIMENTS

Figure 1:
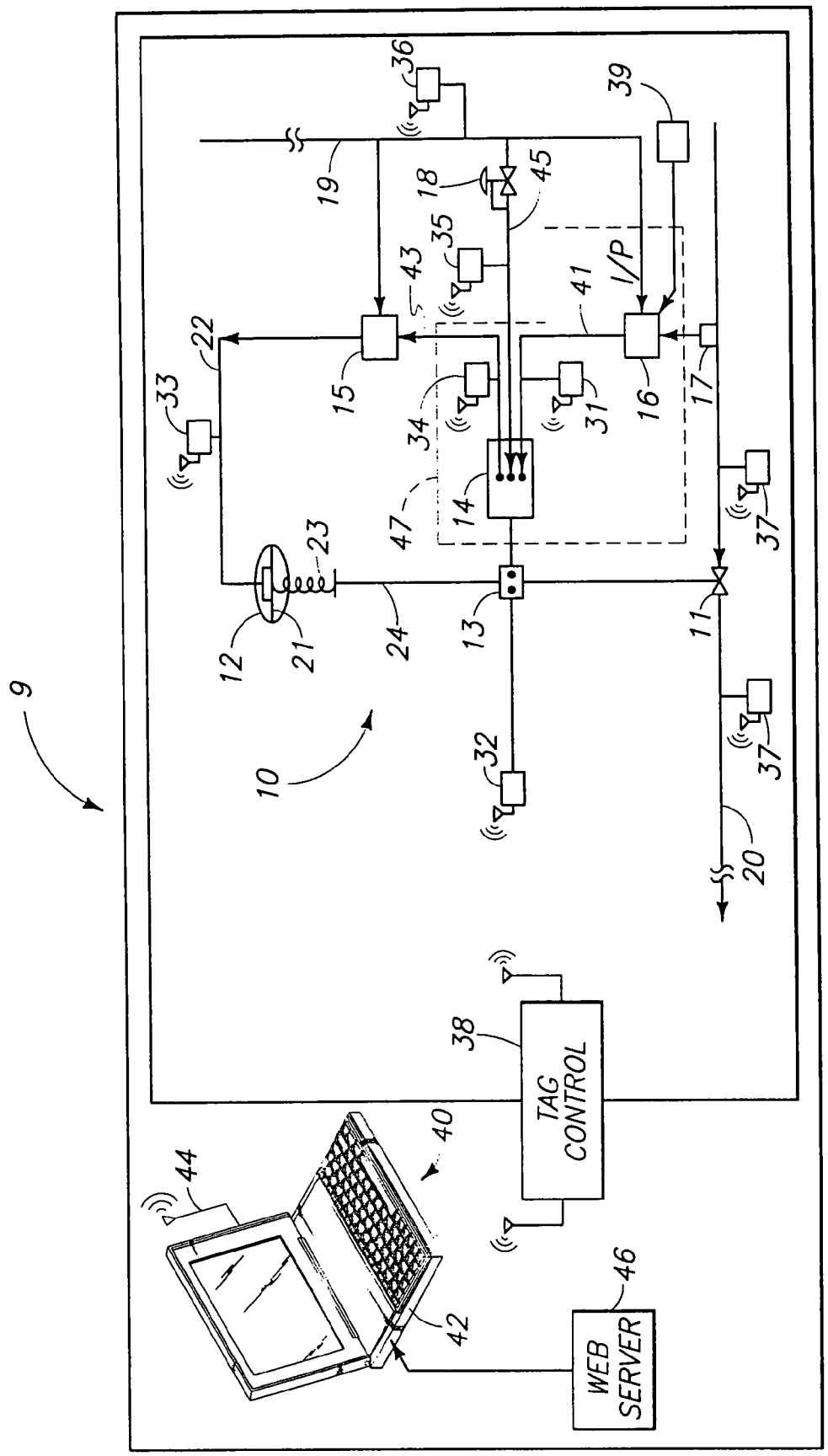
FIG. 1 is a block diagram of a system including a pneumatically operated valve and a plurality of RFID sensor assemblies embodying various aspects of the invention.

FIG. 1 shows a system embodying various aspects of the invention. The system 9 includes a fluid control or pneumatically operated valve 10. The air operated valve 10 includes a control valve 11, a pneumatic diaphragm actuator 12, a stem coupler 13, a valve positioner 14, a pressure or volume booster 15, a controller and I/P or E/P converter.16, a sensor 17, an air regulator 18, and a pneumatic fluid supply line 19. The valve 11 controls fluid flow through a main fluid line 20. The main fluid line 20 transfers fluid in connection with an industrial process. For example, the main fluid line could transfer fluid used in a power plant (e.g., water or other fluids used in a nuclear power plant). The fluid line 20 may be any other sort of fluid line in an industrial process facility.

In the illustrated embodiment, a condition of the fluid line 20 is sensed (e.g., temperature, pressure, flow) and this information is sent to the valve positioner 14. For example, in the illustrated embodiment, the sensor 17 is a pressure transducer that senses pressure upstream of the valve 11. In alternative embodiments, different parameters can be sensed either upstream or downstream of the valve 11. In the illustrated embodiment, an electro-pneumatic type valve positioner 47 is shown, including pneumatic positioner 14 and I/P converter 16. The sensor 17 provides an output, which is an electrical output in the illustrated embodiment. More particularly, in the illustrated embodiment, the sensor 17 provides a current output. The converter 16 is coupled to the sensor (transducer) 17 and converts an electrical signal (current in the illustrated embodiment) from the sensor 17 to pressure. Other I/P or E/P converters could be employed. In some embodiments, the sensor 17 provides a signal that can be directly used by the valve positioner 14 and the converter 16 is omitted. In alternative embodiments, converter 16 can receive electrical signals from the valve position controller 39, from the sensor 17, or from both the valve position controller 39 and the process sensor 17. The valve position controller 39 is a remote controller, in some embodiments. The valve position controller 39 is a manually operable controller in some embodiments.

In the illustrated embodiment, the converter 16 is coupled to the valve positioner 14 which supplies an operating pneumatic pressure to the actuator 12. The diaphragm actuator 12 includes a diaphragm 21, and a spring 23 operating on the diaphragm. The diaphragm actuator 12 can be of a type that is opened by pneumatic fluid and closed by the spring, or can be of a type that is closed by a pneumatic fluid and opened by the spring. The actuator 12 is coupled to a sliding valve stem 24 and to the control valve 11. The spring 23 is biased between the valve stem 24 and the diaphragm 21. Feedback is provided by the actuator-valve stem coupler 13 which has one end connected to the valve stem 24 and another end coupled to the positioner 14 so as to track movement of the valve stem 24. As the valve 11 approaches the closed position, feedback is used to seat the valve 11 without slamming. The regulator valve 18 merely reduces pressure from pneumatic supply line 19 and booster 15 merely increases pressure to a level required to operate the pneumatic actuator 12.

Alternative arrangements are possible. For example, while the pneumatic actuator 12 shown in FIG. 1 is a direct-acting pneumatically operated diaphragm actuation, in which increasing pneumatic pressure pushes down on the diaphragm 21 extending the actuator stem 24, alternative actuator types could be employed. For example, in one alternative embodiment (not shown), a reverse-acting pneumatically operated diaphragm actuator type is employed in which increasing pneumatic pressure pushes up on the diaphragm and retracts the actuator stem. In another alternative embodiment (not shown), a reversible type pneumatic actuator is employed that can be assembled and installed as either a direct-acting or reverse-acting type pneumatic actuator.

Similarly, while an electro-pneumatic type valve positioner 47 is shown in FIG. 1, including pneumatic positioner 14 and I/P converter 16, alternative embodiments are possible. For example, while an analog type electro-pneumatic positioner 14 is shown in FIG. 1, a digital electro-pneumatic positioner is used in alternative embodiments. Further, in some applications a pneumatic type positioner will be used. In these embodiments, the pneumatic positioner 14 receives a pressure input signal directly from the process sensor 17 or valve position controller 166.

In some embodiments, a plurality of RFID sensor assemblies is provided to establish on-line self-diagnostic, prognostic, and calibration capabilities for the pneumatically operated valve. To instrument a component such as the pneumatically operated valve 10, individual RFID sensor assemblies are attached to monitor various parameters. Various RFID sensor assemblies may have unique sensor interfaces. More particularly, the RFID sensor assemblies include mounting structure such that the mounting and sensing is noninvasive to normal valve operation. Some such mounting structures are described below in connection with FIGS. 3 and 4.

The RFID sensor assemblies are used, in the embodiment of FIG. 1, to provide on-line or in-use self-diagnostic, prognostic, and calibration capabilities for pneumatically operated process control valves and control system components. For example, RFID sensor assemblies can be coupled to or proximate (e.g., upstream or downstream of) components such as, for example, the I/P or E/P converter 16, the valve positioner 14, the pressure or volume booster 15, the actuator spring 23, the packing of the control valve 11, and the fluid supply regulator valve 18. In FIG. 1, an RFID sensor assembly 31 is coupled to an electrical conductor 41 between the converter 16 and the valve positioner 14, an RFID sensor assembly 32 is coupled to the actuator-valve stem coupler 13, an RFID sensor assembly 33 is coupled to a conduit 22 between the booster 15 and the pneumatic actuator 21, an RFID sensor assembly 34 is coupled to a conduit 43 between the valve positioner 14 and the booster 15, an RFID sensor assembly 35 is coupled to a conduit 45 between the valve positioner 14 and regulator valve 18, an RFID sensor assembly 36 is coupled to pneumatic supply line 19 between feeds to the regulator valve 18 and to the booster 15, and RFID sensor assemblies 37 are coupled to the process line or conduit 20 on either side of the control valve 11.

The use of RFID sensor assemblies 31-37 allows for condition monitoring (e.g., periodic monitoring and data logging) of important valve performance parameters such as valve seating force, spring 23 preload and spring constant, bench set, spring packing drag or bearing friction loads, linearity of the spring 23, condition of the diaphragm 21, and valve 11 position, stroke times, and calibration. Bench set comprises compression on the spring.

In the illustrated embodiment, the system 9 further includes an RFID control tag 38, and each of the RFID sensor assemblies 31-37 communicates to the control tag 38. This is, in some embodiments, a bi-directional link so that the control tag 38 can request data from the RFID sensor assemblies 31-37 and also communicate with a reader. The system 9 further includes a reader 40 defined by, for example, a portable computer 42 such as a laptop or personal digital assistant plus an RF receiver or module 44 coupled to the laptop or personal digital assistant for communication with the laptop or personal digital assistant. Communication can be via an RS-232 link, PCMCIA connection, serial port, or other communication link. In the illustrated embodiment, the computer 42 includes software that allows for data transfer from the control tag 38 and/or the RFID sensor assemblies 31-37. The software (or separate software) permits setting up the tags.

In other embodiments, the RFID sensor assemblies 31-37 communicate directly with the reader, instead of through the control tag 38.

In the illustrated embodiment, the RF link between the reader 40 and the control tag 38 (and/or the sensor assemblies 31-37) is a low power link. For example, low power is used for transmissions. This allows the read/write range to be restricted to a predetermined range. The restricted read/write range allows for multiple networks to be placed in zones or grids, much like cell phone grids, without crossover RF interference.

The tags have individual IDs, only tags with requested IDs will respond. In the illustrated embodiment, the tags and reader operate in a frequency band that does not require government licensing such as the ISM (industrial scientific measurement) band in the U.S. or frequency bands that similarly do not require government licensing in other countries.

The RFID sensor assemblies 31-37 could be or include, in some embodiments, RFID tags that are the same as or substantially similar to the RFID tags described in the following patent applications, which are incorporated herein by reference: U.S. patent application Attorney Ser. No. 10/263,826, filed Oct. 2, 2002, entitled "Radio Frequency Identification Device Communications Systems, Wireless Communication Devices, Wireless Communication Systems, Backscatter . Communication Methods, Radio Frequency Identification Device Communication Methods and a Radio Frequency Identification Device" by inventors Michael A. Hughes and Richard M. Pratt; U.S. patent application Ser. No. 10/263,809, filed Oct. 2, 2002, entitled "Method of Simultaneously Reading Multiple Radio Frequency Tags, RF Tag, and RF Reader", by inventors Emre Ertin, Richard M. Pratt, Michael A. Hughes, Kevin L. Priddy, and Wayne M. Lechelt; U.S. patent application Ser. No. 10/263,873, filed Oct. 2, 2002, entitled "RFID System and Method Including Tag ID Compression", by inventors Michael A. Hughes and Richard M. Pratt; U.S. patent application Ser. No. 10/264,078, filed Oct. 2, 2002, entitled "System and Method to Identify Multiple RFID Tags", by inventors Michael A. Hughes and Richard M. Pratt; U.S. patent application Ser. No. 10/263,940, filed Oct. 2, 2002, entitled "Radio Frequency Identification Devices, Backscatter Communication Device Wake-Up Methods, Communication Device Wake-Up Methods and A Radio Frequency Identification Device Wake-Up Method", by inventors Richard Pratt and Michael Hughes; U.S. patent application Ser. No. 10/263,997, filed Oct. 2, 2002, entitled "Wireless Communication Systems, Radio Frequency Identification Devices, Methods of Enhancing a Communications Range of a Radio Frequency Identification Device, and Wireless Communication Methods", by inventors Richard Pratt and Steven B. Thompson; U.S. patent application Ser. No. 10/263,670, filed Oct. 2, 2002, entitled "Wireless Communications Devices, Methods of Processing a Wireless Communication Signal, Wireless Communication Synchronization Methods and a Radio Frequency Identification Device Communication Method", by inventors Richard M. Pratt and Steven B. Thompson; U.S. patent application Ser. No. 10/263,656, filed Oct. 2, 2002, entitled "Wireless Communications Systems, Radio Frequency Identification Devices, Wireless Communications Methods, and Radio Frequency Identification Device Communications Methods", by inventors Richard Pratt and Steven B. Thompson; U.S. patent application Ser. No. 10/263,635, filed Oct. 4, 2002, entitled "A Challenged-Based Tag Authentication Model", by inventors Michael A. Hughes and Richard M. Pratt; U.S. patent application Ser. No. 09/589,001, filed Jun. 6, 2000, entitled "Remote Communication System and Method", by inventors R. W. Gilbert, G. A. Anderson, K. D. Steele, and C. L. Carrender; U.S. patent application Ser. No. 09/802,408; filed Mar. 9, 2001, entitled "Multi-Level RF Identification System"; by inventors R. W. Gilbert, G. A. Anderson, and K. D. Steele; U.S. patent application Ser. No. 09/833,465, filed Apr. 11, 2001, entitled "System and Method for Controlling Remote Device", by inventors C. L. Carrender, R. W. Gilbert, J. W. Scott, and D. Clark; U.S. patent application Ser. No. 09/588,997, filed Jun. 6, 2000, entitled "Phase Modulation in RF Tag", by inventors R. W. Gilbert and C. L. Carrender; U.S. patent application Ser. No. 09/589,000, filed Jun. 6, 2000; entitled "Multi-Frequency Communication System and Method", by inventors R. W. Gilbert and C. L. Carrender; U.S. patent application Ser. No. 09/588,998; filed Jun. 6, 2000, entitled "Distance/Ranging by Determination of RF Phase Delta", by inventor C. L. Carrender; U.S. patent application Ser. No. 09/797,539, filed Feb. 28, 2001, entitled "Antenna Matching Circuit", by inventor C. L. Carrender; U.S. patent application Ser. No. 09/833,391, filed Apr. 11, 2001, entitled "Frequency Hopping RFID Reader", by inventor C. L. Carrender.

The RF tags offer significant features at the sensors. The tags include microprocessors. In the illustrated embodiments, the microprocessors allow for calibration, compensation, pre-processing, and onboard diagnostics and prognostics. Each tag includes a large amount of nonvolatile memory. In some embodiments, the RFID tags are used as data loggers. The tags use the memory to periodically or at various times store data that is measured by the sensors. The nonvolatile memory is also used to store setup information that is particular to the type of sensor and the tag application requirements. For example, the time period for acquiring data is user settable (e.g., times when data is to be taken and frequency of data logging within specified time ranges). Each control tag and RFID tag included in the assemblies 31-37 has its own unique identification code or ID which is a main element in the RF protocol for communications. In some embodiments, the RF link between the reader 40 and the control tag or RFID assembly 31-37 is two way (RF reader 40 request tag to transmit). In other embodiments, the RF link between the reader 40 and the control tag or RFID assembly 31-37 is one way (tag periodically transmits to an RF reader). In some embodiments, the reader 40 is coupled to (or selectively coupled to) the Internet and defines a web server so that process reporting is performed via web pages and so that users can monitor process parameters using web browsers. Alternatively, data from the reader 40 is transferred at times to a web server 46 separate from the reader.

The system of FIG. 1 can be adapted for use with either sliding stem or rotary stem control valves and actuator assemblies with either pneumatic or electromagnetic controllers.

Figure 2A:
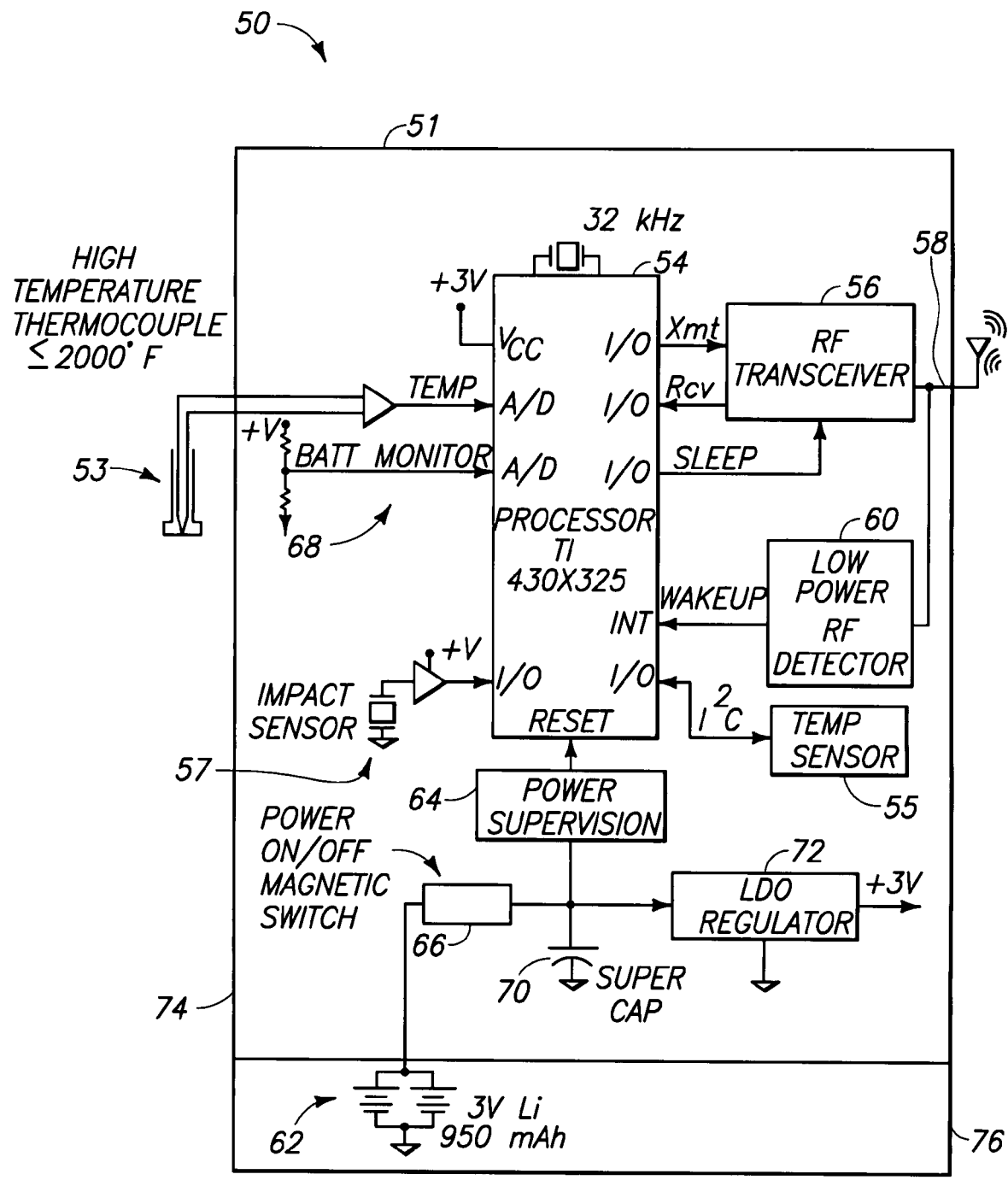
FIG. 2A is a circuit schematic of a RFID sensor assembly.
Figure 6:
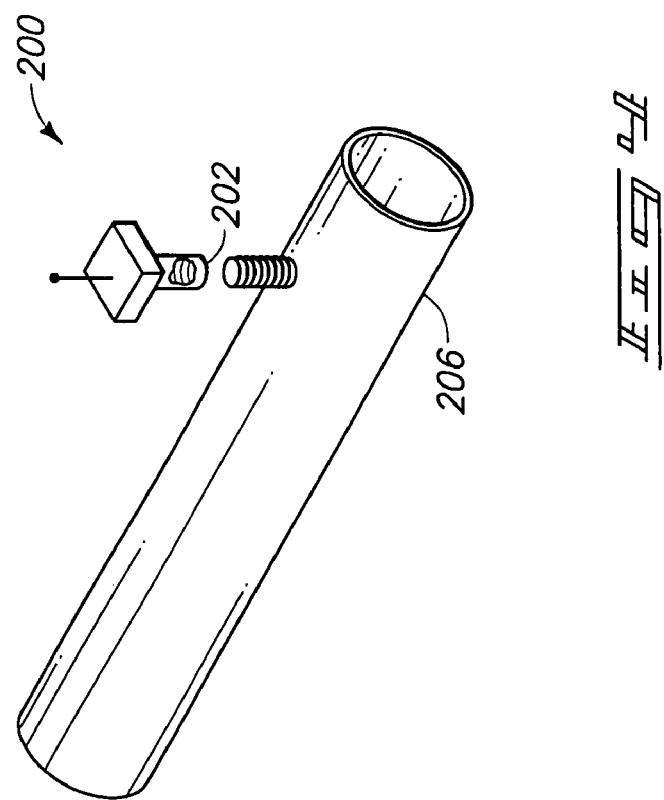
Figure 5:
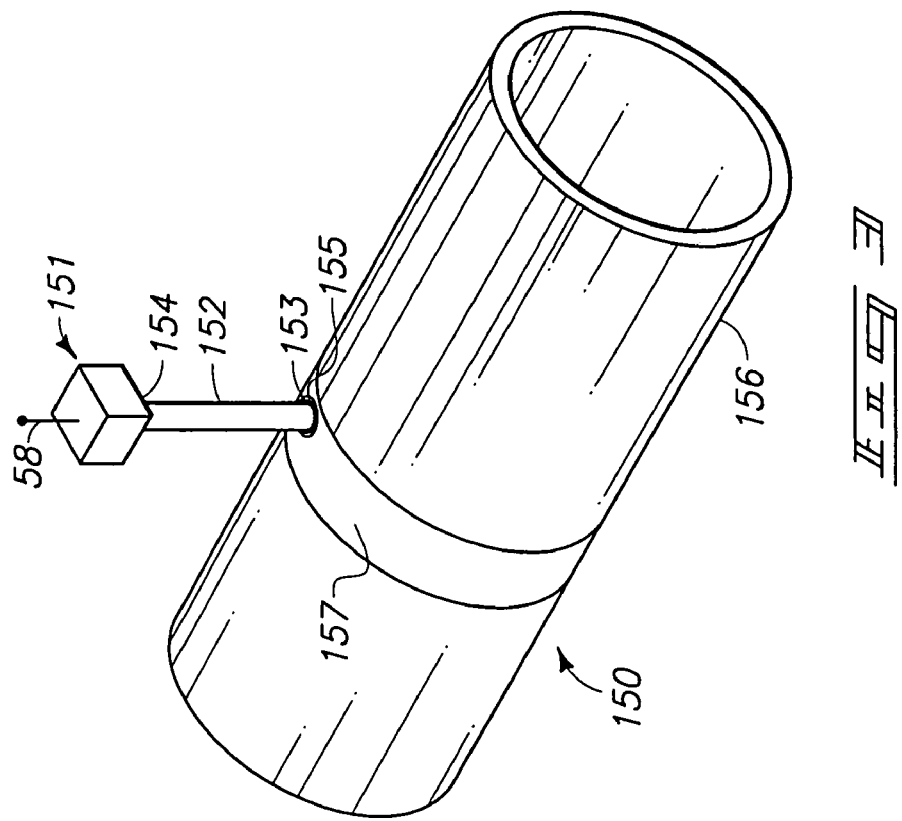

Another RFID sensor assembly design is shown in FIG. 2A. The RFID sensor assemblies are relatively small. The RFID sensor assembly 50 that is shown in FIG. 2A is configured to sense temperature and impact (acceleration). Other parameters are sensed in alternative embodiments. The RFID sensor assembly 50 includes a processor 54 that can accommodate both analog and digital sensors. In the illustrated embodiment, the processor 54 is a Texas Instruments 430× 325 integrated circuit microprocessor. Other embodiments are possible. A thermocouple 53 and a temperature sensor 55 are coupled to the microprocessor. In the illustrated embodiment, the thermocouple 53 is a high temperature thermocouple. Other temperature sensors are possible. The system 50 further includes an impact sensor or accelerometer 57 coupled to the processor 50; e.g., via a buffer op-amp.

The assembly 50 further includes an RF transceiver 56 coupled to the processor 54 and to an antenna 58. The assembly 50 further includes a low power RF detector 60 configured to provide a wakeup signal to the processor 54.

The assembly 50 further includes a battery 62 coupled to the integrated circuit 54 to supply power to various components of the assembly 50 that require electrical power. In the illustrated embodiment, the assembly 50 includes a power supervisor 64 coupled to a reset input of the integrated circuit 54 and a power on/off switch 66 coupled between the power supervisor 64 and the battery 62. The assembly 50 further includes a battery monitor 68 coupled to the integrated circuit 54 and configured to monitor the condition of the battery. In the illustrated embodiment, the assembly 50 further includes a super capacitor or ultracapacitor 70 and an LDO regulator 72 having an input coupled to a positive terminal of the ultracapacitor 70. The input of the LDO regulator 72 and the positive terminal of the super capacitor 70 are also coupled to the on/off switch 66. The LDO regulator 72 has an output that provides a regulated voltage to the various electronic components of the assembly 50. The ultracapacitor 70 provides supplemental power for RF communications and allows continued operation when the battery 62 is replaced. The components of the assembly 50 other than the battery 62 and thermocouple 53 are enclosed in a common housing 74 and the battery 62 is enclosed in a housing 76 that is removable from the housing 74. The components enclosed in the housing 74 and in the housing 76, and the housings 74 and 76 together can be referred to as an RFID tag 51.

In some embodiments, sensors such as strain gauges and/or LVDTs are used. In such embodiments, interface circuitry is provided between the sensor and the microprocessor 54.

The reader 52 (FIG. 2B) includes a transceiver 78 configured to communicate with the transceiver 56 (FIG. 2A). The reader 52 further includes a processor 80 coupled to the transceiver 78. In the illustrated embodiment, the processor 80 is a Texas Instruments 430×325 integrated circuit microprocessor. The reader 52 further includes a battery 82. The reader 52 further includes an LDO regulator 84 configured to provide a regulated voltage to electrical components of the reader 52. The reader 52 further includes an on/off switch 86 coupled between the battery 82 and the LDO regulator 84. The reader 52 also includes an interrogate switch 88 which, when actuated, causes the reader 52 to interrogate the tag assembly 50 (FIG. 2A). The reader 52 further includes input/output interfaces such a display 90.

In the illustrated embodiment, the reader 52 further includes a low battery indicator a power on indicator 92, and a speaker 96. Other embodiments are possible.

In the illustrated embodiment, the reader 52 is configured to be coupled to a PDA or portable computer. In alternative embodiments, the reader 52 is coupled to or incorporated in a PDA or portable computer and uses the display and/or speaker, and/or keyboard or input interface of the PDA or computer.

Some aspects of the invention provide a suite of RFID sensor assemblies for sensor use in industrial process control. The suite can include, for example, sensors configured to sense one or more of temperature, pressure, strain, or other process control parameters. In some aspects of the invention, a tailored mechanical package or mounting structure is provided to allow the RFID tag to be readily adapted to a particular process component or parameter.

For example, FIG. 3 is a perspective view of a sensor assembly 150, which can be substantially similar to the RF tag assembly 50 shown in Fig. 2A. The sensor assembly 50 includes an RFID tag 151, which can be identical to or substantially identical to the RFID tag 51 shown in FIG. 2A. The assembly 151 is configured to be used to measure temperature and may be placed in a high temperature environment. The assembly 151 includes a probe or waveguide 152 having first and second ends 153 and 154. The first end 153 defines a tip, and a thermocouple 155 is supported on the tip. The RFID tag 151 is supported on the second end 154.

An RFID sensor assembly for use with a fluid conduit such as one used in a nuclear reactor includes a band that encircles the fluid conduit 156, and an RFID tag supported by the band. The sensor assembly can be for sensing temperature, such as the sensor assembly 150 shown in FIG. 3. The RFID sensor assembly 150 is for use with a fluid conduit 156 and includes a band 157 that encircles the fluid conduit 156, and an RFID tag 151 supported by the band 157.

An RFID sensor assembly 200 for use in sensing pressure is shown in FIG. 4 and includes a gas inlet port 202 configured to be coupled to a port on a conduit 206. For example, the gas inlet port, in some embodiments, is configured to be coupled (mechanically mated) to an ancillary port or threaded stub on a flow pipe.

A variety of additional RFID sensor assembly designs is contemplated, the above specific designs being provided by way of example. Each RFID sensor assembly includes a mating adaptor that allows for ease of installation and minimization of modification to existing process control components. Some RFID sensor assemblies just sense switch closures such as for limit switches or relay contacts.

The ability to locally add desired sensing to an industrial process provides tremendous flexibility for continually adding to, modifying, or enhancing a sensor network.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A process control monitoring system comprising:
    a plurality of radio frequency identification devices associated with respective ones of a plurality of process control elements of an industrial plant;
    an interrogator configured to implement wireless communications with respect to the radio frequency identification devices, wherein the interrogator is configured to output a plurality of first wireless interrogation signals which identify the radio frequency identification devices;
    a reader configured to implement wireless communications with respect to the interrogator;
    wherein the radio frequency identification devices are individually configured to receive the first wireless interrogation signals, and for individual ones of the first wireless interrogation signals, to determine whether the individual first wireless interrogation signal identifies the individual one of the radio frequency identification devices and to communicate a first wireless reply signal comprising information of the respective one of the process control elements to the interrogator responsive to the individual first wireless interrogation signal identifying the individual one of the radio frequency identification devices; and
    wherein the reader is configured to output a second wireless interrogation signal comprising an identifier and the interrogator is configured to communicate a second wireless reply signal to the reader which comprises the information received from the radio frequency identification devices responsive to determining that the identifier of the second wireless interrogation signal outputted by the reader is identical to an identifier of the interrogator.

2. The system of claim 1 wherein the radio frequency identification devices are configured to monitor operations of the respective process control elements, and the information of the first wireless reply signal comprises information regarding the operations of the respective one of the process control elements.

3. The system of claim 1 wherein the first wireless interrogation signals individually identify more than one of the radio frequency identification devices.

4. The system of claim 1 wherein the radio frequency identification devices comprise respective identifiers and the first wireless interrogation signals comprise the identifiers which identify the radio frequency identification devices.

5. The system of claim 4 wherein the respective radio frequency identification device is configured to output the first wireless reply signal responsive to an identifier of at least one of the first wireless interrogation signals matching the identifier of the respective radio frequency identification device.

6. The system of claim 4 wherein the identifiers comprised by the radio frequency identification devices comprise unique identifiers of respective ones of the radio frequency identification devices, and wherein the respective radio frequency identification device is configured to output the first wireless reply signal responsive to the identifier of at least one of the first wireless interrogation signals matching the unique identifier of the respective radio frequency identification device.

7. The system of claim 1 wherein the interrogator is configured to use the information to estimate a remaining useful life of one of the process control elements.

8. The system of claim 1 wherein the plurality of radio frequency identification devices comprise microprocessors and the microprocessors are configured to predict future behavior of the process control elements.

9. The system of claim 1 wherein:
the interrogator is a first interrogator located within a first geographical zone of the industrial plant;
the plurality of radio frequency identification devices comprises a first plurality of radio frequency identification devices located within the first zone; and further comprising:
a second plurality of radio frequency identification devices located within a second geographical zone of the industrial plant different from the first geographical zone, the second plurality of radio frequency identification devices being associated with respective ones of a second plurality of process control elements of the industrial plant;
a second interrogator configured to implement wireless communications with respect to the second plurality of radio frequency identification devices; and
wherein the reader is configured to:
output a third wireless interrogation signal identifying the second interrogator and the second interrogator is configured to communicate a third wireless reply signal to the reader as a result of reception of the third wireless interrogation signal, the third wireless reply signal comprising information received from the second plurality of radio frequency identification devices; and
move within the industrial plant so that the reader is in communication with the first interrogator but not the second interrogator during the second wireless interrogation when the reader is in the first zone and in communication with the second interrogator but not the first interrogator during the third wireless interrogation when the reader is in the second zone.

10. The system of claim 1 wherein the reader is configured to implement the wireless communications with respect to the interrogator via a wireless communication channel directly coupling the reader and the interrogator.

11. A process control monitoring system comprising:
a plurality of radio frequency identification devices configured to monitor operations of respective ones of a plurality of process control elements of an industrial plant and to store information regarding the operations of the respective process control elements responsive to the monitoring;
a control tag configured to implement first wireless communications with the radio frequency identification devices and to receive the information regarding the operations of the process control elements from the radio frequency identification devices via the first wireless communications; and
a reader configured to implement second wireless communications with the control tag and to receive the information regarding the operations of the process control elements from the control tag via the second wireless communications, the second wireless communications comprising an interrogation signal which comprises an identifier that uniquely identifies the control tag; and
wherein the control tag is configured to output a reply signal of the second wireless communications which comprises the information regarding the operations of the process control elements as a result of reception of the interrogation signal by the control tag.

12. The system of claim 11 wherein the reply signal comprises a first reply signal and the interrogation signal comprises a first wireless interrogation signal and wherein the control tag is configured to output a second wireless interrogation signal which identifies at least one of the radio frequency identification devices, and the at least one of the radio frequency identification devices is configured to output a second wireless reply signal which comprises the information regarding the operations of a respective one of the process control elements responsive to the identifying of the at least one of the radio frequency identification devices.

13. The system of claim 11 wherein the control tag receives other interrogation signals which do not identify the control tag and the control tag is configured to not respond to the other interrogation signals.

14. The system of claim 11 wherein:
the control tag is a first control tag located within a first geographical zone of the industrial plant;
the interrogation signal is a first interrogation signal;
the reply signal is a first reply signal;
the plurality of radio frequency identification devices comprises a first plurality of radio frequency identification devices located within the first zone; and further comprising:
a second plurality of radio frequency identification devices located within a second geographical zone of the industrial plant different from the first geographical zone, the second plurality of radio frequency identification devices being associated with respective ones of a second plurality of process control elements of the industrial plant;
a second control tag configured to implement third wireless communications with respect to the second plurality of radio frequency identification devices; and
wherein the reader is configured to:
output a second wireless interrogation signal identifying the second control tag and the second control tag is configured to communicate a second wireless reply signal to the reader as a result of reception of the second wireless interrogation signal, the second wireless reply signal comprising information received from the second plurality of radio frequency identification devices; and move within the industrial plant so that the reader is in communication with the first control tag but not the second control tag during the first wireless interrogation when the reader is in the first zone and in communication with the second control tag but not the first control tag during the second wireless interrogation when the reader is in the second zone.

15. An industrial plant comprising:
a plurality of zones individually comprising:
   a plurality of process control elements of the industrial plant;
   a plurality of radio frequency identification devices configured to obtain information regarding respective ones of the process control elements; and
   a control tag configured to first wirelessly interrogate the radio frequency identification devices of the respective zone, and wherein the radio frequency identification devices of the respective zone are configured to wirelessly communicate the information to the control tag responsive to the first wireless interrogation;
a reader configured to second wirelessly interrogate individual ones of the control tags of the zones, and wherein the control tags are individually configured to wirelessly communicate the information to the reader responsive to the second wireless interrogation; and
wherein the control tags comprise different first identifiers relative to one another, the first identifiers uniquely identifying the control tags, and the control tags are configured to wirelessly communicate the information to the reader as a result of the second wireless interrogation comprising second identifiers identical to the respective first identifiers of the control tags.

16. The plant of claim 15 wherein the radio frequency identification devices are configured to obtain the information comprising status information regarding the process control elements.

17. The plant of claim 15 wherein the zones correspond to different geographical locations of the industrial plant relative to one another and the control tags are configured to communicate only with the radio frequency identification devices in the respective zones.

18. The plant of claim 17 wherein the reader is configured to be moved within the industrial plant so that the reader is in communication with a first one of the control tags but not a second one of the control tags during the second wireless interrogation when the reader is in a first one of the zones and in communication with the second one of the control tags but not the first one of the control tags during the second wireless interrogation when the reader is in a second one of the zones.

19. The plant of claim 15 wherein the control tag of a first zone of the plurality comprises a first one of the first identifiers and is configured to respond to the second wireless interrogation received from the reader responsive to determining that the second wireless interrogation comprises a first one of the second identifiers that is identical to the first one of the first identifiers and the control tag of a second zone of the plurality comprises a second one of the first identifiers different from the first one of the first identifiers and is configured to respond to the second wireless interrogation received from the reader responsive to determining that the second wireless interrogation comprises a second one of the second identifiers that is identical to the second one of the first identifiers.

20. The plant of claim 15 wherein the control tag of a first zone of the plurality comprises one of the first identifiers and is configured to respond to the second wireless interrogation received from the reader responsive to determining that the second wireless interrogation comprises one of the second identifiers that is identical to the one of the first identifiers and to disregard other interrogations received from the reader that do not comprise the one of the second identifiers that is identical to the one of the first identifiers.

21. A process control monitoring method comprising:
using a radio frequency identification device, monitoring operations of a process control element of an industrial plant;
storing information regarding the operations of the process control element using the radio frequency identification device after the monitoring;
outputting a first wireless interrogation signal using an interrogator comprising a control tag;
receiving the first wireless interrogation signal within the radio frequency identification device from the interrogator;
responsive to the receiving the first wireless interrogation signal, outputting a first wireless reply signal using the radio frequency identification device for communication to the interrogator, wherein the first wireless reply signal comprises the information regarding the operations of the process control element;
receiving the first wireless reply signal using the control tag;
receiving a second wireless interrogation signal within the control tag from a reader;
outputting a second wireless reply signal comprising the information for communication to the reader; and
comparing an identifier of the second wireless interrogation signal with an identifier of the control tag, and wherein the outputting of the second wireless reply signal comprises outputting as a result of the identifier of the second wireless interrogation signal being identical to the identifier of the control tag.

22. The method of claim 21 wherein the comparing is a first comparing and further comprising second comparing an identifier of the first wireless interrogation signal with an identifier of the radio frequency identification device and wherein the outputting of the first wireless reply signal comprises outputting responsive to the identifier of the first wireless interrogation signal matching the identifier of the radio frequency identification device.

23. The method of claim 22 wherein the second comparing comprises comparing the identifier of the first wireless interrogation signal with the identifier of the radio frequency identification device which uniquely identifies the radio frequency identification device.

24. The method of claim 21 wherein:
the interrogator is a first interrogator located within a first geographical zone of the industrial plant;
the radio frequency identification device is a first radio frequency identification device located within the first zone;
the information is first information;
the process control element is a first process control element; and further comprising:
   using a second radio frequency identification device located within a second geographical zone of the industrial plant different from the first geographical zone, monitoring operations of a second process control element of the industrial plant;

outputting a third wireless interrogation signal using a second interrogator located within the second zone;

receiving the third wireless interrogation signal within the second radio frequency identification device from the second interrogator;

responsive to the receiving the third wireless interrogation signal, outputting a third wireless reply signal using the second radio frequency identification device for communication to the second interrogator, wherein the third wireless reply signal comprises second information regarding the operations of the second process control element;

receiving the third wireless reply signal using the second interrogator;

receiving a fourth wireless interrogation signal within the second interrogator from the reader;

outputting a fourth wireless reply signal comprising the second information for communication to the reader; and moving the reader within the industrial plant so that the reader is in communication with the first interrogator but not the second interrogator during the second wireless interrogation when the reader is in the first zone and in communication with the second interrogator but not the first interrogator during the fourth wireless interrogation when the reader is in the second zone.

25. The method of claim 21 wherein the receiving of the second wireless interrogation signal comprises receiving the second wireless interrogation signal via a wireless communication channel directly coupling the reader and the control tag.

26. The method of claim 21 wherein the receiving of the second wireless interrogation signal within the control tag comprises receiving the second wireless interrogation signal directly from the reader.

27. A process control monitoring method comprising:

first outputting a first wireless interrogation signal using a control tag;

first receiving the first wireless interrogation signal using a radio frequency identification device which is associated with a process control element of an industrial plant;

second outputting a first wireless reply signal comprising information regarding operations of the process control element using the radio frequency identification device responsive to the first receiving;

second receiving the first wireless reply signal using the control tag;

third outputting a second wireless interrogation signal using a reader;

third receiving the second wireless interrogation signal using the control tag;

fourth outputting a second wireless reply signal comprising the information regarding the operations of the process control element using the control tag responsive to the third receiving;

fourth receiving the second wireless reply signal using the reader; and wherein the fourth outputting comprises outputting as a result of the second wireless interrogation signal comprising an identifier uniquely identifying the control tag.

28. The method of claim 27 wherein the identifier is a first identifier and the radio frequency identification device comprises a second identifier and the second outputting comprises outputting responsive to the first wireless interrogation signal comprising the second identifier.

29. The method of claim 27 further comprising the radio frequency identification device predicting future behavior of the process control element using the information.

30. The method of claim 27 further comprising the radio frequency identification device calibrating the process control element.

31. The method of claim 27 wherein the control tag comprises a first control tag, the radio frequency identification device comprises a first radio frequency identification device and the first radio frequency identification device is associated with a first zone of the industrial plant and further comprising:

outputting a third wireless interrogation signal using a second control tag;

receiving the third wireless interrogation signal using a second radio frequency identification device which is associated with a second process control element and a second zone of the industrial plant;

outputting a third wireless reply signal comprising information regarding operations of the second process control element using the second radio frequency identification device responsive to the receiving of the third wireless interrogation signal;

receiving the third wireless reply signal using the second control tag;

outputting a fourth wireless interrogation signal using the reader;

receiving the fourth wireless interrogation signal using the second control tag;

outputting a fourth wireless reply signal comprising the information regarding the operations of the second process control element using the second control tag responsive to the receiving of the fourth wireless interrogation signal; and receiving the fourth wireless reply signal using the reader.

32. The method of claim 31 wherein the reader is in the first zone during the receiving of the second wireless reply signal and the reader is in the second zone during the receiving of the fourth wireless reply signal and further comprising after the receiving of the second wireless reply signal and before receiving the fourth wireless reply signal, moving the reader from the first zone into the second zone.

33. The method of claim 27 further comprising the radio frequency identification device diagnosing problematic behavior of the process control element using the information.

* * * * *